US012397259B2

(12) United States Patent
Strand et al.

(10) Patent No.: US 12,397,259 B2
(45) Date of Patent: Aug. 26, 2025

(54) ROTATING PACKED BED ARRANGEMENTS

(71) Applicant: Compact Carbon Capture AS, Bergen (NO)

(72) Inventors: Asbjørn Strand, Bergen (NO); Dag Eimer, Bergen (NO); Øyvind Torvanger, Bergen (NO); Jiru Ying, Bergen (NO); Torleif Kongsbakk Madsen, Bergen (NO); Kari Forthun, Bergen (NO)

(73) Assignee: Compact Carbon Caputure AS, Bergen (NO)

( * ) Notice: Subject to any disclaimer, the term of this patent is extended or adjusted under 35 U.S.C. 154(b) by 263 days.

(21) Appl. No.: 18/043,850

(22) PCT Filed: Oct. 25, 2021

(86) PCT No.: PCT/IB2021/059833
§ 371 (c)(1),
(2) Date: Mar. 2, 2023

(87) PCT Pub. No.: WO2022/054037
PCT Pub. Date: Mar. 17, 2022

(65) Prior Publication Data
US 2023/0256382 A1    Aug. 17, 2023

(30) Foreign Application Priority Data

Sep. 9, 2020    (GB) ..................................... 2014155

(51) Int. Cl.
B01D 53/06    (2006.01)
B01D 53/14    (2006.01)
B01D 53/18    (2006.01)

(52) U.S. Cl.
CPC ........... B01D 53/185 (2013.01); B01D 53/06 (2013.01); B01D 53/14 (2013.01); B01D 53/1406 (2013.01); B01D 53/18 (2013.01)

(58) Field of Classification Search
CPC ........ B01D 53/14; B01D 53/18; B01D 53/06; B01D 53/185
See application file for complete search history.

(56) References Cited

U.S. PATENT DOCUMENTS 4,336,233 A     6/1982   Appl et al.
2009/0158930 A1 6/2009   Wagner et al.
2013/0164204 A1 6/2013   Bumb

FOREIGN PATENT DOCUMENTS

CN    104710062 A  *  6/2015
EP    0705637 A1      8/1995
(Continued)

OTHER PUBLICATIONS

Hacking J A, et al., "Improving liquid distribution in a rotating packed bed", Chemical Engineering and Processing: Process Intensification, Elsevier Sequoia, Lausanne, Ch, vol. 149, Feb. 15, 2020 (Feb. 15, 2020), XP086146778, ISSN: 0255-2701, DOI: 10.1016/J.CEP.2020.107861 [retrieved on Feb. 15, 2020] see, in particular, figures 1 and 2. See also p. 2, left column, line 23 to right column, line 5; see also figure 3 and figures 13 and 26.

(Continued)

Primary Examiner — Robert A Hopkins
(74) Attorney, Agent, or Firm — Paul Frank + Collins P.C.

(57) ABSTRACT

Disclosed herein is a rotating packed bed, RPB, arrangement configured to provide mass transfer between a liquid sorbent and a gas, the RPB arrangement comprising: an RPB configured to provide a substantial cross-flow between a liquid sorbent and a gas; and a spray arranged to spray the liquid sorbent onto the RPB; wherein the RPB and spray are both (Continued)

arranged at different longitudinal positions on a gas flow path through the RPB arrangement.

24 Claims, 7 Drawing Sheets

(56) References Cited

FOREIGN PATENT DOCUMENTS

| EP | 1059109 A2 | 6/2000 |
|---|---|---|
| EP | 2486966 A1 | 8/2012 |
| GB | 2566716 A | 3/2019 |
| WO | 2015060725 A1 | 4/2015 |
| WO | 2015187272 A1 | 12/2015 |
| WO | 2019/057932 A1 | 3/2019 |

OTHER PUBLICATIONS

Llerena-Chavez H, et al., "Analysis of flow in rotating packed beds via CFD simulations-Dry pressure drop and gas flow maldistribution", Chemical Engineering Science, Oxford, GB, vol. 64, No. 9, May 1, 2009 (May 1, 2009), pp. 2113-2126, XP026062617, ISSN: 0009-2509, DOI: 10.1016/J.CES.2009.01.019 [retrieved on Jan. 23, 2009] see in particular figures 1, 2b, 11b; see also p. 2114, right column, lines 4-8 and lines 24-26.

Zhao Bingtao, et al., "Mass transfer performance of CO2capture in rotating packed bed: Dimensionless modeling and intelligent prediction", Applied Energy, Elsevier Science Publishers, GB, vol. 136, Sep. 30, 2014 (Sep. 30, 2014), pp. 132-142, XP029094449, ISSN: 0306-2619, DOI: 10.1016/J.APENERGY.2014.08.108 see, in particular, figure 1 (b) cross-flow RPB.

Xie Peng, et al., "Characteristics of liquid flow in a rotating packed bed for CO2capture: A CFD analysis", Chemical Engineering Science, Oxford, GB, vol. 172, Jun. 23, 2017 (Jun. 23, 2017), pp. 216-229, XP085184359,ISSN: 0009-2509, DOI:10.1016/J.CES. 2017.06.040; see, in particular, figure 1.

Neumann Kolja, et al., "A guide on the industrial application of rotating packed beds", Chemical Engineering Research and Design, vol. 134, Jun. 1, 2018 (Jun. 1, 2018), pp. 443-462, XP055887145, Amsterdam, Nlissn: 0263-8762, DOI:10.1016/j.cherd.2018.04.024; see, in particular, figures 1, 9, 12.

Sang LE, et al., "Liquid flow pattern transition, droplet diameter and size distribution in the cavity zone of a rotating packed bed: A visual study", Chemical Engineering Science, Oxford, GB, vol. 158, Oct. 27, 2016 (Oct. 27, 2016), pp. 429-438, XP029838569, ISSN: 0009-2509, DOI: 10.1016/J.CES.2016.10.044 see, in particular figures 1, 2.

Qian Zhi, et al., "Optimal synthesis of rotating packed bed reactor", Computers & Chemical Engineering, vol. 105, Oct. 1, 2017 (Oct. 1, 2017), pp. 152-160, XP055888315, GB ISSN: 0098-1354, DOI: 10.1016/j.compchemeng.2017.02.026 see, figures 2-5.

* cited by examiner

ROTATING PACKED BED ARRANGEMENTS

FIELD

The present disclosure relates to gas capture systems and processes. The gas capture system according to embodiments comprises one or more rotating packed beds. Mass transfer between a gas mixture and a liquid sorbent occurs within each rotating packed bed. Embodiments include advantageous designs of rotating packed bed as well as techniques for supplying a sorbent to a rotating packed bed.

BACKGROUND

A gas capture system reduces the concentration of at least one gas in a mixture of gasses.

There are a large number of applications for gas capture systems. For example, a gas capture system may be used to clean a dirty gas, such as a flue gas, by the gas capture reducing the concentration of carbon dioxide in the dirty gas before it is released into the atmosphere. Alternatively, the gas mixture may be, for example, a mixture of hydrogen and carbon dioxide generated by a reforming process. The gas capture system may reduce the concentration of carbon dioxide in the gas mixture to generate substantially pure hydrogen.

WO2019/057932 A1 discloses a gas capture system in which a gas mixture is passed through a plurality of rotating packed beds, RPBs. Mass transfer between the gas mixture and a liquid sorbent occurs within each RPB with the flow of sorbent being in substantial cross-flow to the flow of gas.

An advantage of the gas capture system disclosed in WO2019/057932 A1 is that the flow rate of sorbent through each RPB is dependent on the rotational speed of the RPB. High sorbent flow rates can therefore be achieved. The gas capture system is compact and suitable for use in applications where the available space for a gas capture system is restricted.

SUMMARY

Aspects of the invention are set out in the independent claims. Optional features are set out in the dependent claims.

LIST OF FIGURES

DESCRIPTION

Embodiments provide alternatives to some of the techniques disclosed in WO2019/057932 A1. In particular, embodiments provide new designs of rotating packed bed as well as new techniques for supplying a sorbent to a rotating packed bed.

The techniques according to embodiments may be used in the gas capture system disclosed in WO2019/057932 A1. The entire contents of WO2019/057932 A1 are incorporated herein by reference.

In WO2019/057932 A1, a liquid sorbent is supplied to an inner surface of an annular RPB from a liquid supply within the shaft that supports the RPB. The surface of the RPB that receives the sorbent is substantially orthogonal to the surface of the RPB that receives the gas mixture.

Embodiments provide an alternative approach to supplying a liquid sorbent to an RPB. According to embodiments, one or more sprays of liquid sorbent are provided in the gas flow path through the gas capture system. Liquid sorbent is sprayed onto parts of the same surface of the RPB that receives the gas flow.

Embodiments may improve on known techniques by improving the uniformity of the distribution of the liquid sorbent in the mass transfer region of the RPB. Embodiments may also be easier to implement than known techniques.

Figure 1:
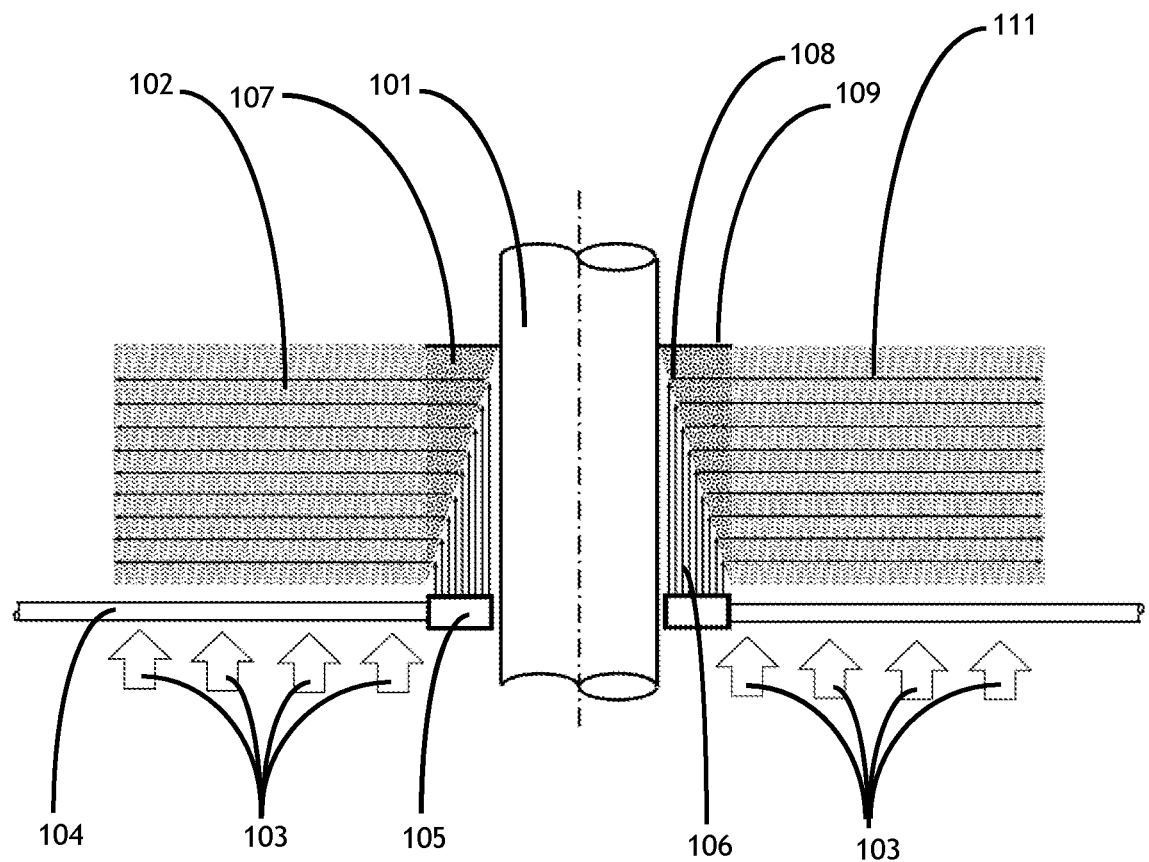
FIG. 1 shows an RPB arrangement according to an embodiment.

FIG. 1 shows an RPB arrangement according to a first embodiment. The RPB arrangement comprises an RPB and a spray 104. The spray 104 is arranged to spray liquid sorbent onto a surface of the RPB.

A gas mixture flows into the RPB arrangement along a gas flow path 103. The gas flow path is substantially parallel to the axis of the rotating shaft 101 that supports the RPB and is therefore in axial direction.

Although not shown in FIG. 1, the RPB arrangement is arranged within a substantially tubular housing. In a plane orthogonal to the axis of the rotating shaft 101, the housing surrounds the RPB arrangement. As disclosed in WO2019/057932 A1, a complete system may comprise a plurality of RPB arrangements with all of the RPB arrangement provided on the same rotating shaft. The plurality of RPB arrangements may all be provided within the same housing.

A number of tubular arms 104 are mounted to an inner surface of the housing. Each arm may be a channel for supplying a flow of liquid sorbent. A source of liquid sorbent may be provided outside of the housing and the sorbent supplied to the inside of the housing through the arms 104. The arms 104 may extend into the inner part of the housing to a substantially tubular nozzle unit 105 that is supported on the end of the arms 104.

Figure 2:
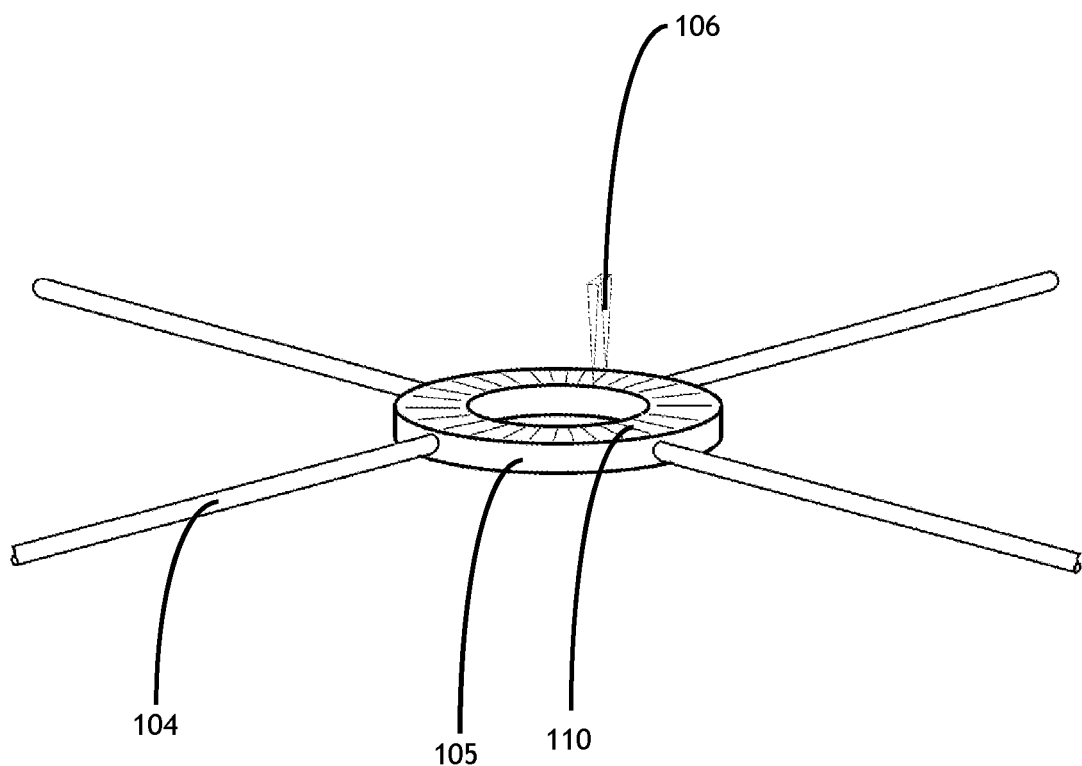
FIG. 2 shows a nozzle unit 105 according to an embodiment.

FIG. 2 shows a nozzle unit 105 according to the first embodiment. The nozzle unit 105 may be located close to, and surround, the shaft 101. The nozzle unit 105 comprises a plurality of openings 110. The openings 110 may be, for example, nozzles, linear slots, circular slots or have other shapes. As shown in FIG. 2, the openings may be radially extending linear slots. The nozzle unit may comprise a plurality of sets of nozzles. Within each set of nozzles the nozzles may be arranged with radially different positions. The angular spacing between adjacent sets of nozzles may be substantially constant. The nozzle unit may be a single unit or comprise a plurality of sections.

The sorbent supplied to the nozzle unit 105 is sprayed out through the openings 110 as a liquid spray 106. The direction of the sprayed liquid 106 may be substantially orthogonal to the plane of the major surface of the nozzle unit 105 that the openings are provided in.

As shown in FIG. 1, the RPB comprises a mass transfer arrangement. The mass transfer arrangement comprises a sorbent receiving section 107 arranged to receive sprayed liquid sorbent 106 from a nozzle unit 105. The mass transfer arrangement also comprises a mass transfer section configured to support mass transfer between gas and the received sorbent. In a plane orthogonal to the rotational axis, the mass transfer section 102 of the mass transfer arrangement surrounds the sorbent receiving section 107 of the mass transfer arrangement. The mass transfer section 102 may be substantially tubular and the longitudinal axis of the tubular mass transfer section may be substantially the same as the rotational axis of the RPB. Each sorbent receiving section may be substantially tubular. The longitudinal axis of the tubular sorbent receiving section may be substantially the same as the rotational axis of the RPB. Each mass transfer section may be arranged to support a substantial radial flow of sorbent and a substantial cross-flow of the sorbent and a gas.

As shown in FIG. 1, the sprayed liquid 106 is directed towards a sorbent receiving section 107 in the RPB. The sorbent receiving section 107 extends over a radial length of the RPB. The sorbent receiving section 107 may have a tubular form. An outer surface of the sorbent receiving section 107 may have a substantially cylindrical shape. An inner surface of the sorbent receiving section 107 may have a substantially conical shape. The sorbent receiving section 107 may comprise a porous material. The porous material may be, for example, a metal foam, a sintered metal object, a polymer foam, a wire mesh cut, expanded metal or any other appropriate form of structural packing design, and wrapped to form a cone section on the inside and a cylindrical surface on the outer surface.

The mass transfer section 102 may comprise a porous material with a high specific area and a low flow resistance for an axially directed gas flow. The mass transfer section 102 may be made, for example, from wrapped metal mesh. The mesh may comprise different shapes made from wire. The mass transfer section 102 may be made from the same material as the sorbent receiving section but with the material in the mass transfer section 102 arranged so that it has a lower density than that in the sorbent receiving section 107.

The porous material of the sorbent receiving section 107 may have a much higher flow resistance for gas and liquid than the porous material of the mass transfer section 102.

The sprayed liquid sorbent 106 may be directed onto the conically shaped inner surface of the sorbent receiving section 107. When the sprayed sorbent hits the inner surface, some of the sorbent may be absorbed into the porous material and flow within the RPB. Due to the centrifugal force caused by the rotation of the RPB, the sorbent will flow radially away from the axis of the shaft 101 towards an outer perimeter of the RPB. The spray 105 of sorbent may be substantially uniformly distributed onto the inner surface of the sorbent receiving section 107. The sorbent may thereby be substantially uniformly distributed around the outer surface of the sorbent receiving section 107 as it flows from the sorbent receiving section 107 into the mass transfer section 102. By spraying the sorbent onto a conical surface, the sorbent flow that is distributed in the radial direction across the openings of the nozzle unit 105 becomes an axially distributed flow in the mass transfer section 102.

The uniformity of the distribution of the sorbent around the axis of the shaft 101 may be dependent on the number and distribution of openings 110 provided in the nozzle unit 105. The uniformity of the sorbent distribution may also be increased by the rotation of the RPB, and may improve as the rotational speed of the RPB is increased.

The substantial flow resistance of the porous material of the sorbent receiving section 107 may slow the flow of the sorbent in the sorbent receiving section 107 and thereby improve the uniformity of the flow of sorbent into the mass transfer section 102.

The porous material of the sorbent receiving section 107 may also have a substantially higher flow resistance for gas than the mass transfer section 102. The gas flow through the RPB may therefore mostly be through the mass transfer section 102 and not through the sorbent receiving section 107. As shown in FIG. 1, the sorbent receiving section may comprise a solid wall 109 to prevent a gas flow through the sorbent receiving section. The wall 109 may be a disc in a plane orthogonal to the rotational axis. Advantageously, the wall 109 increases the gas flow through the mass transfer section 102 and prevents a gas flow only through the sorbent receiving section 107.

The RPB may also comprise one or more further walls 111 within the both the sorbent receiving section 107 and mass transfer section 102 of the RPB. Each of the one or more further walls 111 may be a substantial, or partial, disc in a plane orthogonal to the rotational axis and arranged in parallel planes. The one or more further walls 111 may both force a substantially radial flow of sorbent through the sorbent receiving section 107 and mass transfer section 102 and may also increase the structural integrity of the RPB. The one or more further walls 111 may be perforated, such as slotted, so that gas may flow in an axial direction through the mass transfer section 102.

Figure 3:
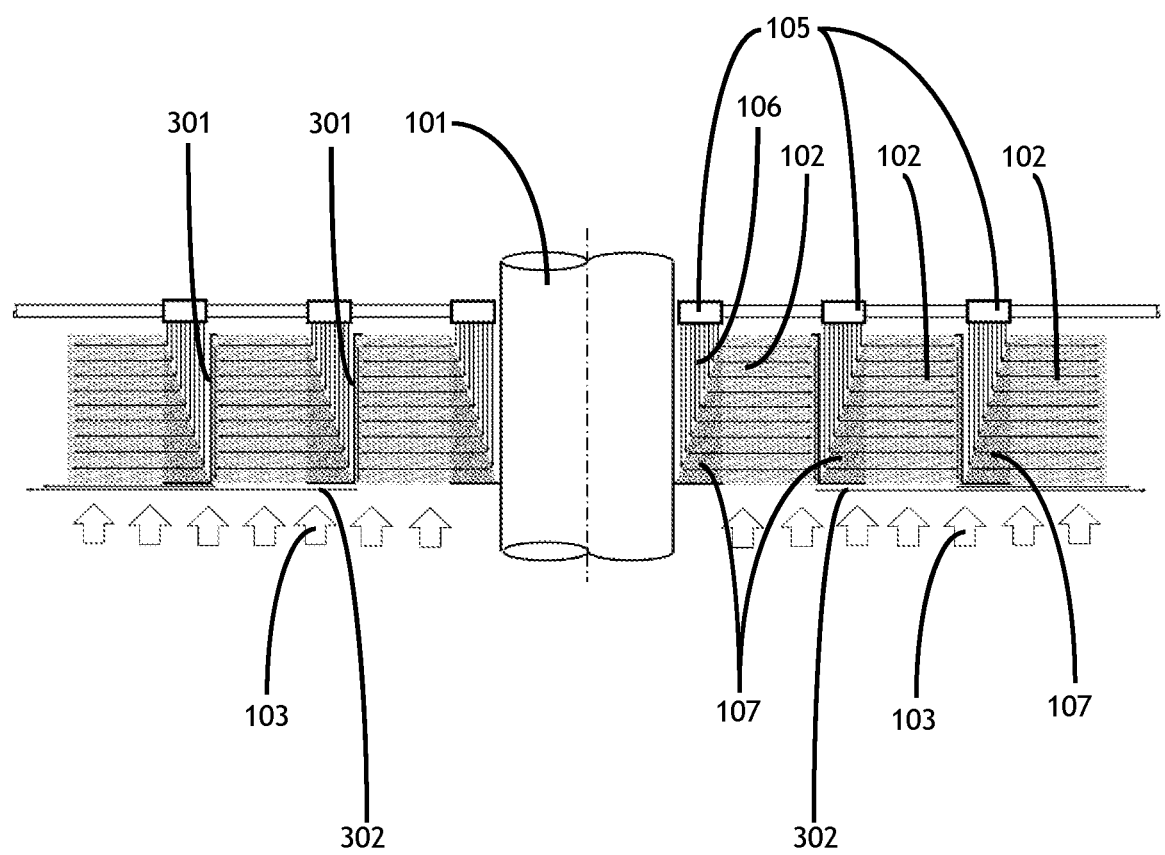
FIG. 3 shows an RPB arrangement according to an embodiment.

In the embodiment shown in FIG. 1, the nozzle unit 105 is up-stream in the gas flow path 103 relative to the RPB. The direction of the sprayed liquid sorbent 106 is therefore in substantial co-flow with the gas. As shown in FIG. 3, embodiments also include the nozzle unit 105 being downstream in the gas flow path 103 relative to the RPB. The direction of the sprayed liquid sorbent 106 is therefore in substantial counter-flow with the gas.

FIG. 1 shows one nozzle unit 105, for providing sprayed liquid sorbent 106, as well as a corresponding sorbent receiving section 107 in the RPB. An RPB may comprise only a single nozzle unit 105 and a single sorbent receiving section 107 as shown in FIG. 1.

However, embodiments also include an RPB comprising a plurality of nozzle units 105 and a respective plurality of sorbent receiving sections 107 in the RPB. The plurality of nozzle units 105 and respective plurality of sorbent receiving sections 107 may be arranged in the same plane and concentrically around the axis of the shaft 101.

FIG. 3 shows another implementation of the first embodiment in which there are three nozzle units 105 and a corresponding three mass transfer arrangements in the RPB. Each nozzle unit 105 and corresponding mass transfer arrangement may be substantially the same as, and/or comprise substantially corresponding parts as, the nozzle unit 105 and mass transfer arrangement described above with reference to FIGS. 1 and 2. In particular, each nozzle unit 105 may be arranged to spray sorbent in a direction that is substantially parallel to the axis of the shaft 101. Each mass transfer arrangement comprises a sorbent receiving section 107 of porous material that has a conical surface for receiving the sorbent. Each mass transfer arrangement also comprises a mass transfer section 102 and sorbent is arranged to flow radially outward through each mass transfer section 102.

A tubular wall 301 may be provided at the boundary between adjacent receiving sections. Each tubular wall may prevent the direct flow of sorbent from a mass transfer section 102 of a mass transfer arrangement into the sorbent receiving section 107 of a different mass transfer arrangement. One or more ducts 302 may be provided on the opposite side of the RPB to the nozzle unit 105. Each duct 302 may have similar configuration to the nozzle unit 105 and tubular arms 104 shown in FIG. 2 so that it does not substantially obstruct the gas flow path. Each duct 302 may be integrated with the support structure of the RPB.

Sorbent that flows radially through a mass transfer section 102 onto a tubular wall 301 may flow along the axial length of the wall 301 into one of the ducts 302. The ducts 302 are arranged to collect the sorbent and to provide a guided flow path of the sorbent to the inner wall of the housing. The inner wall of the housing may comprise openings so that the sorbent may flow out of the housing.

An advantage of the walls 301 is that each sorbent receiving section 107 substantially does not receive used sorbent from another receiving section. Each sorbent receiving section 107 substantially therefore only receives a fresh supply of sorbent from a corresponding nozzle unit 105.

Embodiments also include an RPB comprising a plurality of nozzle units 105, a respective plurality of sorbent receiving sections 107 and tubular walls 301 as shown in FIG. 3. Each tubular wall 301 may be perforated, such as slotted, so that some of the sorbent may flow through each tubular wall 301 and some of the sorbent flows into a one of the ducts 302. Advantageously, this may increase the liquid flux of the sorbent and the path length of sorbent for capturing a gas. The addition of sorbent along the radial path of sorbent may also improve the sorbent distribution and increase the gas-sorbent contact area.

Embodiments also include an RPB comprising a plurality of nozzle units 105 and a respective plurality of sorbent receiving sections 107, as shown in FIG. 3, but without the RPB comprising any of the tubular walls 301 and ducts 302. Advantageously, this may increase the liquid flux of the sorbent and the path length of sorbent for capturing a gas. The addition of sorbent along the radial path of sorbent may also improve the sorbent distribution and increase the gas-sorbent contact area.

RPBs that comprise a plurality of nozzle units 105 and respective plurality of mass transfer arrangements may be preferred in high volume gas capture systems. A housing with a large inner diameter may be required to support a large gas flow rate. The use of a plurality of nozzle units 105 and mass transfer arrangements allows a large sorbent flow rate to be provided.

Further embodiments of nozzle units and mass transfer arrangements are shown in FIGS. 4 to 7. All of FIGS. 4 to 7 show part of a single nozzle unit and part of corresponding single mass transfer arrangement that is rotationally symmetric about the axis of the shaft 101.

Figure 4:
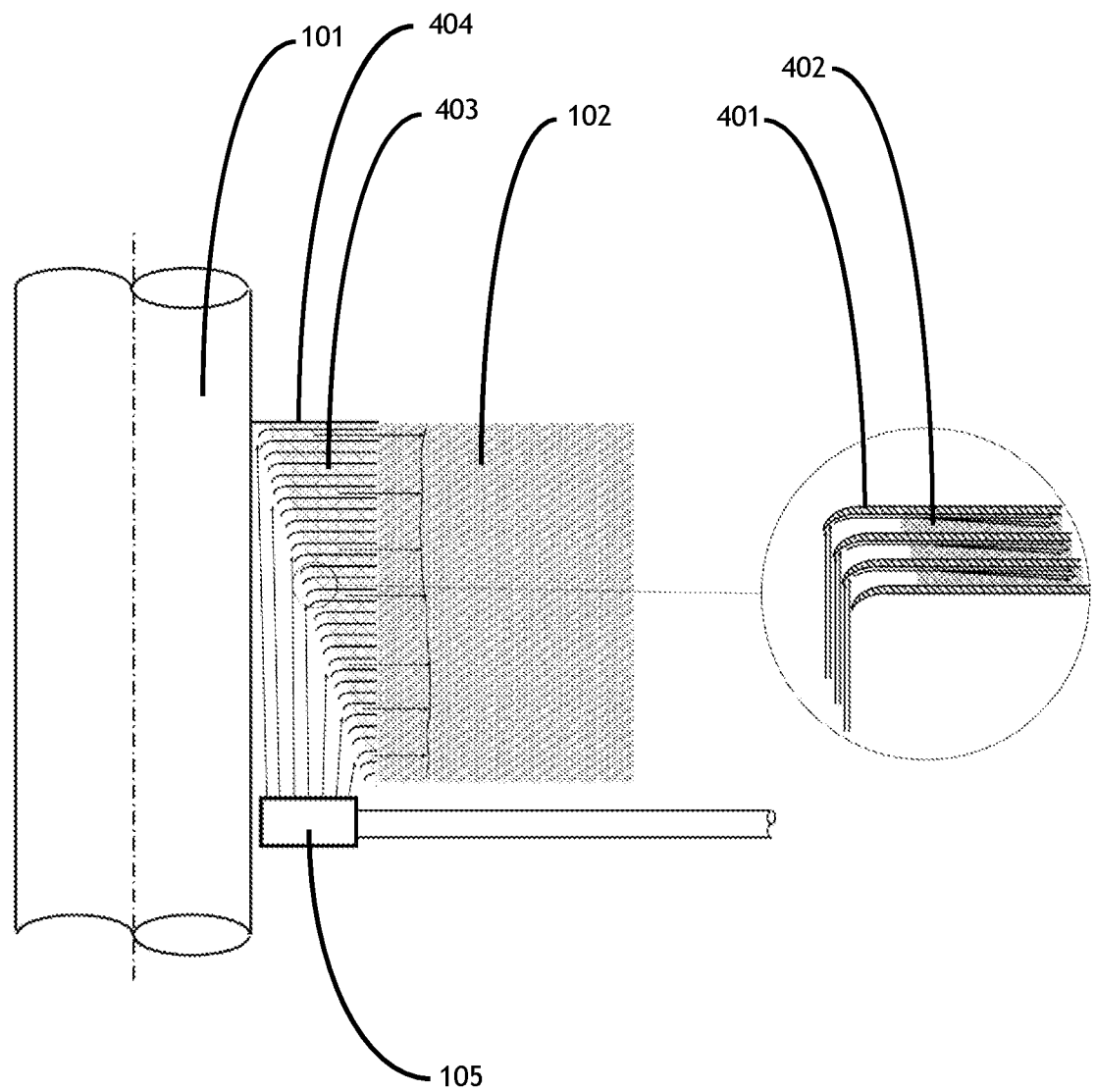
FIG. 4 shows part of a nozzle unit and part of a mass transfer arrangement according to an embodiment.
Figure 5:
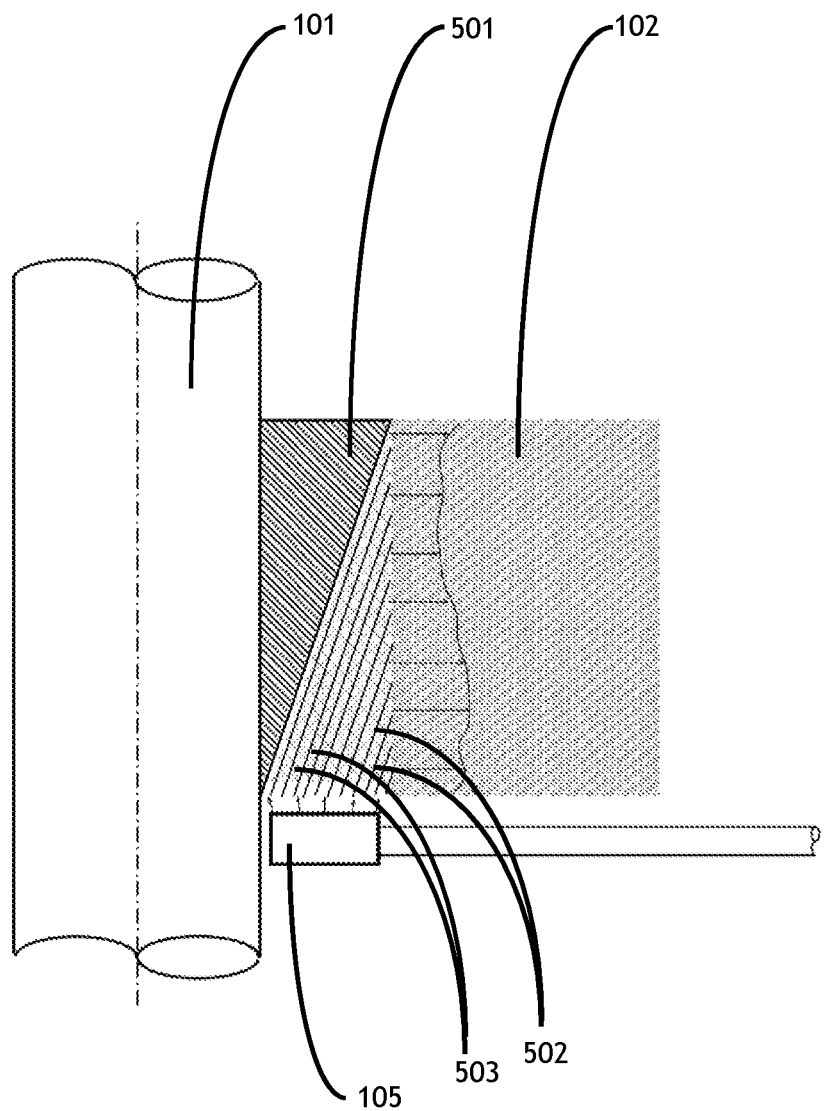
FIG. 5 shows part of a nozzle unit and part of a mass transfer arrangement according to an embodiment.

FIG. 4 shows a second embodiment with an alternative design of sorbent receiving section 403. The sorbent receiving section 403 is similar to the sorbent receiving section 107 of the first embodiment to the extent that it may have a tubular form. An outer surface of the sorbent receiving section 403 may have a substantially cylindrical shape. An inner surface of the sorbent receiving section 403 may have a substantially conical shape.

The sorbent receiving section 403 shown in FIG. 4 may differ from that shown in FIG. 1 by comprising a large plurality of annular discs 401. The discs 401 may be arranged coaxially in a stack. The closest disc 401 to the nozzle unit 105 may be the disc 401 with the largest inner diameter. The inner diameter of the discs 401 may sequentially decrease as the distance from the nozzle unit 105 increases. The disc 401 that is furthest from the nozzle unit 105 may have the smallest inner diameter. All of the discs 401 may have the same outer diameter.

The inner edge, i.e. inner perimeter, of each disc 401 may be curved towards the nozzle unit 105. The curvature may help to deflect the flow of sorbent that hits the inner edge of each disc 401 so that the flow path of sorbent is deflected substantially orthogonally into the sorbent receiving section 403.

One or more layers of wire mesh 402 may be provided between adjacent discs 401 in the stack. The mesh 402 slows the flow rate of the liquid into the mass transfer section 102 and thereby may increase the axial and circumferential uniformity of the flow of sorbent. The mesh 402 may also help to reduce, or prevent, gas flowing through the sorbent receiving section 403.

The width of each disc 401 in a direction parallel to the axis of the shaft 101 may be, for example, 0.5 mm to 1 mm. The thickness of the wire mesh 402 in a direction parallel to the axis of the shaft 101 may be, for example, 2 mm to 5 mm.

In the second embodiment, each nozzle unit 105 may be the same as already described for the first embodiment. Alternatively, the liquid sprays from the nozzle units 105 may be slightly angled relative to a parallel direction to the axis of the shaft 101 so that each spray is directed towards one or more gaps between adjacent discs 401 for receiving a spray.

In the second embodiment, each mass transfer section 102 may be substantially the same as the described for the first embodiment.

Similar to as described above for wall 109 in the first embodiment, in the second embodiment gas may be prevented from only flowing through the sorbent receiving section 403, and thereby bypassing the mass transfer section 102, by a radially extending wall 404.

Similar to as described above for the first embodiment, the RPB in the second embodiment may comprise a plurality of concentrically arranged nozzles units 105 and corresponding mass transfer arrangements. Each mass transfer arrangement may comprise a sorbent receiving section 403 and mass transfer section 102 according to the second embodiment. Tubular walls 301 may be provided between adjacent mass transfer arrangements and ducts 302 may be provided for providing guided flow paths for the sorbent.

FIG. 5 shows part of an RPB design according to a third embodiment. In the third embodiment, the sorbent receiving section comprises a plurality of guides 502 that are the walls of a plurality of channels for directing the sprayed sorbent towards the mass transfer section 102. The guides 502 may be a plurality of concentrically arranged conical walls. The sorbent may enter the channels close to the nozzles unit 105 and leave the channels at the boundary between the sorbent receiving section and the inner perimeter of the mass transfer section 102. One or more layers of wire mesh 503 may be provided within each channel for resisting, i.e. slowing, the flow of sorbent through each channel. This may increase the uniformity of the flow of sorbent.

The longest guide 502 may be a similar conical wall 502 to the other guides.

Alternatively, as shown in FIG. 5, the longest guide 502 may be a conical outer surface of a solid tubular section 501. The solid tubular section 501 may have a cylindrical inner surface and a conical outer surface. The solid tubular section 501 may prevent a gas flow path that bypasses the mass transfer section 102 by only flowing through the sorbent receiving section. The guides 502 and mesh 503 may prevent a short gas flow path through only the upper part of the mass transfer section 102.

In the third embodiment, each nozzle unit 105 may be the same as already described for the first embodiment. Alternatively, the liquid sprays from the nozzle unit 105 may be slightly angled relative to a parallel direction to the axis of the shaft so that each spray is more directed towards channels for receiving a spray.

In the third embodiment, each mass transfer section 102 may be substantially the same as the described for the first embodiment.

Similar to as described above for the first embodiment, the RPB in the third embodiment may comprise a plurality of concentrically arranged nozzles units 105 and corresponding mass transfer arrangements. Each mass transfer arrangement may comprise a sorbent receiving section and mass transfer section 102 according to the third embodiment.

Tubular walls 301 may be provided between adjacent mass transfer arrangements and ducts 302 may be provided for providing guided flow paths out of the housing for the sorbent.

The ends of the guides 502 at the boundary with the mass transfer section 102 may have a substantially saw-tooth, or chevron, shape to increase the uniformity of the axial and/or circumferential distribution of the sorbent.

The distance, in a direction parallel to the axis of the shaft 101, between adjacent guides 502 may be between about 1 mm and 20 mm, and is preferably between 2 mm and 5 mm. In another preferred implementation, the ends of the guides 502 at the boundary with the mass transfer section 102 may have a substantially saw-tooth, or chevron, shape and the distance between adjacent guides may be about 10 mm, or more than 10 mm.

Figure 6:
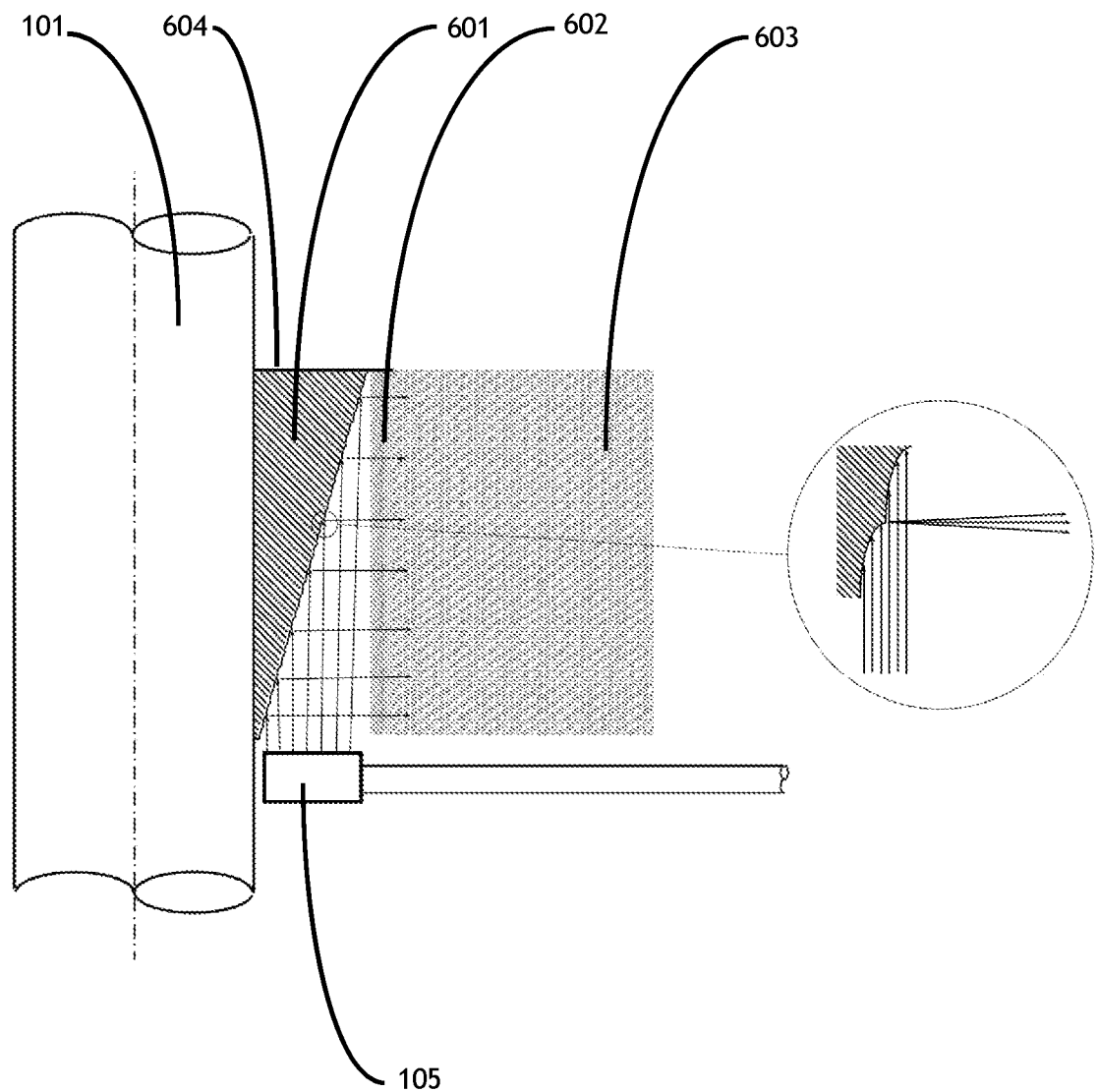
FIG. 6 shows part of a nozzle unit and part of a mass transfer arrangement according to an embodiment.

A fourth embodiment is shown in FIG. 6. In the fourth embodiment, the sorbent receiving section 601 may be tubular. The tubular sorbent receiving section 601 may have a cylindrical inner surface and a substantially conical outer surface. The substantially conical outer surface may be arranged so that the diameter of the outer surface increases as the axial distance from the nozzle unit 105 increases. As shown in FIG. 6, the substantially conical outer surface may comprise a plurality of curved indentations that are arranged to deflect received sprays of sorbent so that the sorbent flows substantially radially towards the mass transfer section 602, 603. The deflection of each spray of sorbent may also cause the spray to spread axially before the sorbent reaches the mass transfer section 602, 603. This may improve the axial uniformity of the sorbent flow that enters the mass transfer section 602, 603.

The mass transfer section 602, 603 may differ from that in the first to third embodiments by further comprising a tubular layer, 602, of high density packing material for receiving the sorbent flow from the sorbent receiving section 601. The high density packing material 602 may have a higher density, and/or higher specific surface area, than the packing material in the rest of the mass transfer section 603 so that it has a higher resistance to the gas flow. The rest of the mass transfer section 603 may comprise the same type and density of packing material to the mass transfer section in the first to third embodiments. The high density packing material 602 may be constructed from similar materials, and in a similar way, to the packing material in rest of the mass transfer section 603. The sorbent receiving section 601 may comprise a radially extending wall 604 that covers, in a radial direction the sorbent receiving section 601 and the high density packing material 602. The radially extending wall 604 may help to prevent the gas flow path substantially bypassing the mass transfer section 602, 603.

Figure 7:
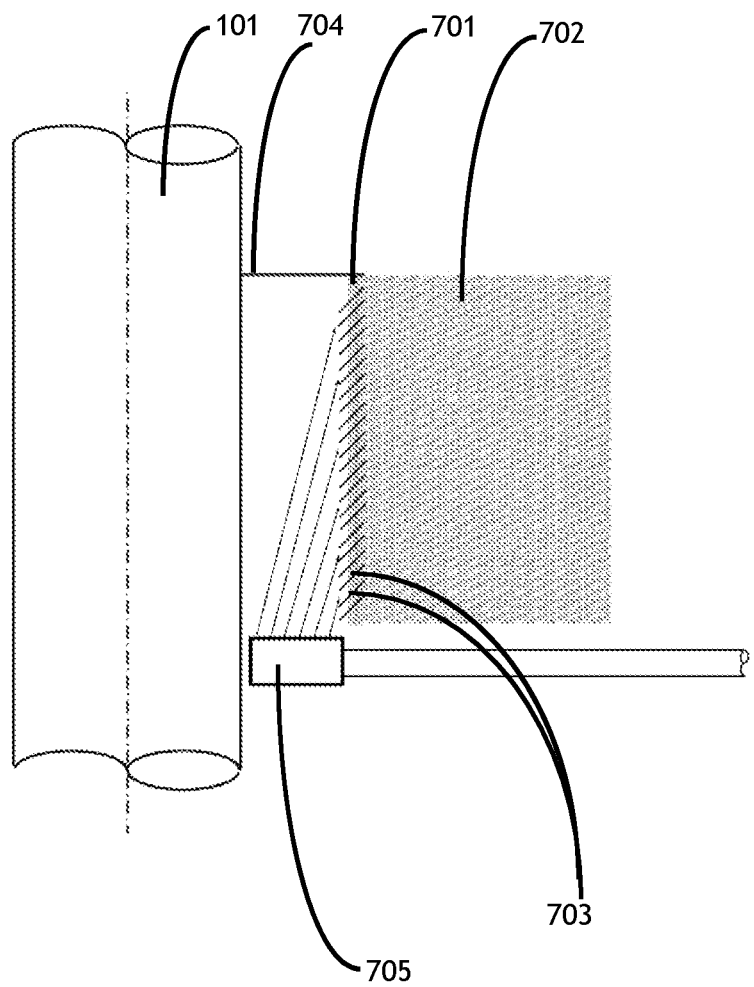
FIG. 7 shows part of a nozzle unit and part of a mass transfer arrangement according to an embodiment.

A fifth embodiment is shown in FIG. 7. In the fifth embodiment, the mass transfer section 701, 702 comprises a tubular layer 701 of high density, and/or higher specific surface area, packing material for receiving the sorbent flow before the sorbent flows into the rest of the mass transfer section 702, in which the packing material has a lower density. The tubular layer 701 of high density packing material may be substantially the same as the tubular layer 602 of high density packing material as described for the fourth embodiment. The rest of the mass transfer section 702 may be substantially the same as the rest of the mass transfer section 603 as described for the fourth embodiment.

A plurality of annular discs 703 may be provided in the tubular layer 701. Each pair of adjacent annular discs 703 defines a channel for receiving sorbent, and directing the sorbent into the mass transfer section 701, 702. The walls of the annular discs 703 may be substantially conical or curved. An end of the walls of the annular discs may protrude out of the tubular layer 701 towards the shaft 101. One, or both, ends of the walls may comprise substantial saw teeth or chevrons. This may help to reduce, or prevent, stratified flow of the sorbent in the mass transfer section 701, 702.

In the fifth embodiment, the nozzle unit 705 may differ from the nozzle unit 105 in the first embodiment by the sprays of sorbent all being angled from an axis parallel to the axis of the shaft 101. Each spray of sorbent may be directed towards a channel. The nozzle unit 705 may otherwise be the same as the nozzle unit 105 in the first embodiment. A radially extending wall 704 may also be provided that substantially covers, in a radial direction, the region between the shaft 101 and the high density packing material 702. The radially extending wall 704 may help to prevent the gas flow path substantially bypassing the mass transfer section 701, 702.

In the fifth embodiment, the sorbent receiving section may be an open area that sorbent is sprayed through. The sorbent receiving section is partially bounded by the shaft 101, the wall 704 and the high density packing material 702.

Embodiments include a number of modifications and variations to the above described techniques.

In particular, embodiments include each mass transfer section 102 of the first to third embodiments being similar to the mass transfer sections 602, 603, 701, 702 of the fourth and fifth embodiments. Accordingly, the mass transfer section of the first to third embodiments may further comprise a tubular layer of high density packing material for receiving the sorbent flow from the sorbent receiving section. The high density packing material may have a higher density, and/or higher specific surface area, than the packing material in the rest of the mass transfer section so that it has a higher resistance to the gas flow. The rest of the mass transfer section may comprise the same type and density of packing material to the mass transfer section already described in the first to third embodiments. The high density packing material may be constructed from similar materials, and in a similar way, to the packing material in rest of the mass transfer section.

In all of the above-described embodiments, the spray may be either up-stream or down-steam of the RPB. The sprayed liquid may therefore either be in co-flow or counter flow with the gas.

Each RPB may comprise any number of mass transfer arrangements. For example, the number of mass transfer arrangements may be between 1 and 10.

The RPBs according to embodiments may be used in any of the gas capture systems disclosed in WO2019/057932 A1, instead of, or in addition to, the RPB designs disclosed therein.

Embodiments include uses in other applications than gas capture with a liquid sorbent. Embodiments also include liquid sorbent regeneration, i.e. in gas desorbers.

Embodiments may more generally be used in any application in which a substantial cross-flow between a gas and a liquid is supported by one or more RPBs.

The RPBs according to embodiments may have a wide range of dimensions. Preferably, the inner diameter of the annular RPB, i.e. the diameter of the central hole in the annulus, is in the range 0.5 m to 4 m. Preferably, the outer diameter of the annular RPB is in the range 3 m to 10 m. Preferably, the inner diameter of the annular RPB is one third of the outer diameter of the annular RPB.

The RPB may be operated so that it has a centrifugal force that is preferably in the range 10-100 G, and the centrifugal force is more preferably 60 G.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A rotating packed bed ("RPB") arrangement configured to provide mass transfer between a liquid sorbent and a gas, the RPB arrangement being disposed on a shaft that is configured to rotate around a rotational axis, comprising:
   an RPB having an axis and configured to provide a substantial cross-flow between a liquid sorbent and a gas, the RPB comprising one or more mass transfer arrangements; and
   a spray arranged to spray the liquid sorbent onto the RPB, wherein each mass transfer arrangement comprises:
      a sorbent receiving section arranged to receive the liquid sorbent from the spray; and
      a mass transfer section configured to support mass transfer between the gas and the liquid sorbent,
   wherein, in a plane orthogonal to the rotational axis, the mass transfer section of each mass transfer arrangement surrounds the sorbent receiving section of the mass transfer arrangement,
   wherein the RPB arrangement comprises a plurality of concentrically arranged mass transfer arrangements, and
   wherein the RPB and spray are both arranged at different longitudinal positions on a gas flow path through the RPB arrangement.

2. The RPB arrangement according to claim 1, wherein the RPB is arranged to rotate about the rotational axis.

3. The RPB arrangement according to claim 1, wherein:
   the mass transfer section of each mass transfer arrangement is substantially tubular;
   the longitudinal axis of the tubular mass transfer section is substantially the same as the rotational axis of the RPB;
   each sorbent receiving section is substantially tubular; and
   the longitudinal axis of the tubular sorbent receiving section is substantially the same as the rotational axis of the RPB.

4. The RPB arrangement according to claim 1, wherein each mass transfer section is arranged to support a radial flow of sorbent and a cross-flow of the sorbent and a gas.

5. The RPB arrangement according to claim 1, wherein:
   each sorbent receiving section comprises an end wall arranged to block a gas flow path through only the sorbent receiving section of the mass transfer arrangement;
   in a plane orthogonal to the rotational axis the end wall is substantially annular; and
   the end wall is provided on the opposite side of the RPB arrangement to the spray.

6. The RPB arrangement according to claim 1, wherein wherein each sorbent receiving section is arranged to absorb a received flow of sorbent; and
   the sorbent receiving section is configured so that the absorbed sorbent flows through the sorbent receiving section towards the mass transfer section.

7. The RPB arrangement according to claim 1, wherein each sorbent receiving section is arranged to deflect a received flow of sorbent so that the sorbent flows substantially away from the sorbent receiving section and towards the mass transfer section.

8. The RPB arrangement according to claim 1, wherein each sorbent receiving section is configured to provide a flow of sorbent to a mass transfer section with the flow of sorbent distributed across an inner surface of the mass transfer section.

9. The RPB arrangement according to claim 1, further comprising:
   a tubular wall at each boundary between the mass transfer section of one mass transfer arrangement and the sorbent receiving section of a different mass transfer arrangement; and
   one or more ducts arranged to support a flow of sorbent from each tubular wall to an outer periphery of the RPB arrangement,
   wherein each tubular wall is arranged to block a direct flow of sorbent between the mass transfer section of one mass transfer arrangement and the sorbent receiving section of said a different mass transfer arrangement.

10. The RPB arrangement according to claim 1, wherein each sorbent receiving section comprises packing material.

11. The RPB arrangement according to claim 1, further comprising packing material,
   wherein the packing material comprises one or more of a metal foam, a sintered metal object, a polymer foam, a wire mesh or expanded metal.

12. The RPB arrangement according to claim 1, wherein, in each mass transfer arrangement, the flow resistance of gas and/or liquid in the sorbent receiving section is higher than that in the mass transfer section.

13. The RPB arrangement according to claim 1, wherein:
   each mass transfer section comprises a substantially tubular first part and a substantially tubular second part;
   in a plane orthogonal to the rotational axis, the substantially tubular second part surrounds the substantially tubular first part; and the substantially tubular first part is arranged to have a higher flow resistance of gas and/or liquid than the substantially tubular second part.

14. The RPB arrangement according to claim 1, wherein:
the spray comprises one or more nozzle units with the number of nozzle units being the same as the number of sorbent receiving sections;
each nozzle unit is arranged to spray sorbent onto a sorbent receiving section;
in a plane orthogonal to the rotational axis, each nozzle unit is substantially annular; and
the spray comprises one or more tubular arms arranged to support and provide a flow of sorbent to each nozzle unit.

15. The RPB arrangement according to claim 1, wherein:
the spray comprises one or more nozzle units with the number of nozzle units being the same as the number of sorbent receiving sections;
each nozzle unit is arranged to spray sorbent onto a sorbent receiving section;
in a plane orthogonal to the rotational axis, each nozzle unit is substantially annular; and
the spray comprises one or more tubular arms arranged to support and provide a flow of sorbent to each nozzle unit; and
wherein:
there are a plurality of concentrically arranged nozzle units; and
each nozzle unit is arranged to spray sorbent onto a different sorbent receiving section.

16. The RPB arrangement according to claim 1, wherein:
the spray comprises one or more nozzle units with the number of nozzle units being the same as the number of sorbent receiving sections;
each nozzle unit is arranged to spray sorbent onto a sorbent receiving section;
in a plane orthogonal to the rotational axis, each nozzle unit is substantially annular; and
the spray comprises one or more tubular arms arranged to support and provide a flow of sorbent to each nozzle unit; and
wherein each nozzle unit comprises a plurality of sets of nozzles;
within each set of nozzles the nozzles arranged with radially different positions; and
the angular spacing between adjacent sets of nozzles is substantially constant.

17. The RPB arrangement according to claim 1, wherein:
the spray comprises one or more nozzle units with the number of nozzle units being the same as the number of sorbent receiving plane orthogonal to the rotational axis, each nozzle unit is substantially annular; and
the spray comprises one or more tubular arms arranged to support and provide a flow of sorbent to each nozzle unit; and
wherein the nozzles of each nozzle unit are arranged to provide a substantially even distribution of sorbent to a surface of a sorbent receiving section.

18. The RPB arrangement according to claim 1, wherein:
each sorbent receiving section comprises a receiving surface for receiving sorbent from the spray;
the receiving surface is shaped so that it is at least part of a substantial cone; and
in a direction along the rotational axis, the radius of the cone decreases as the distance from the spray increases.

19. The RPB arrangement according to claim 1, wherein:
each sorbent receiving section comprises a plurality of stacked co-axial annular discs;
each disc is in a plane that is orthogonal to the rotational axis;
the discs are arranged so that, in a direction along the rotational axis, the inner diameter of the discs decreases as the distance from the spray increases; and
packing material is arranged between adjacent discs.

20. The RPB arrangement according to claim 1, wherein:
each sorbent receiving section comprises a plurality of sorbent guides;
the shape of each sorbent guide is at least part of a substantial cone;
the sorbent guides provide a plurality of channels for sorbent;
each channel has a first end that is close to a nozzle unit and is arranged to receive a flow of sorbent; and
each channel has a second end that is at a boundary between the sorbent receiving section and a mass transfer section and is arranged to provide a flow of sorbent to the mass transfer section.

21. The RPB arrangement according to claim 1, wherein:
each sorbent receiving section comprises a receiving surface for receiving sorbent from the spray;
the shape receiving surface is at least part of a substantial cone; and
the receiving surface is arranged so that, in use, a received flow of sorbent is directed away from the receiving surface and towards the inner surface of a mass transfer section.

22. The RPB arrangement according to claim 1, wherein:
each sorbent receiving section comprises a plurality of stacked co-axial annular discs;
each disc is in a plane that is orthogonal to the rotational axis;
packing material is arranged between adjacent discs, all of the discs are substantially the same;
the walls of the discs are shaped to be at least part of a cone; the discs provide a plurality of channels for sorbent;
each channel has a first end arranged to receive a flow of sorbent and a second end arrange to provide a flow of sorbent to the mass transfer section.

23. A rotating packed bed, RPB, system comprising:
a gas inlet for receiving gas;
a sorbent inlet for receiving a liquid sorbent;
one or more RPB arrangements according to claim 1;
a rotatable shaft arranged to rotate the one or more RPB arrangements; and
a gas outlet for outputting gas; and a sorbent outlet for outputting sorbent.

24. The RPB arrangement according to claim 1, wherein the gas flow path through the RPB arrangement is substantially parallel to the rotational axis.

* * * * *